United States Patent
Kim et al.

(10) Patent No.: US 6,528,133 B1
(45) Date of Patent: Mar. 4, 2003

(54) POLYESTER HEAT-SHRINKABLE TUBE FOR COATING AN ELECTROLYTE CONDENSER

(75) Inventors: Young-Seok Kim, Kyunggi-do (KR); Jun-Myoung Song, Seoul (KR); Kuk-Ung Kim, Kwangju (KR)

(73) Assignee: Kolon Industries, Inc., Kyunggi-do (KR)

( * ) Notice: Subject to any disclaimer, the term of this patent is extended or adjusted under 35 U.S.C. 154(b) by 145 days.

(21) Appl. No.: 09/639,954

(22) Filed: Aug. 17, 2000

(30) Foreign Application Priority Data

Jan. 20, 2000 (KR) .......................... 2000-2686

(51) Int. Cl.[7] .................. B65B 53/02; B29D 23/00
(52) U.S. Cl. ............... 428/34.9; 428/36.9; 174/DIG. 8; 264/230; 264/DIG. 71
(58) Field of Search ............... 428/34.9, 36.9; 204/164, 165; 174/DIG. 8, 35 R, 356 C; 264/DIG. 71, 230

(56) References Cited

U.S. PATENT DOCUMENTS

| | | | | |
|---|---|---|---|---|
| 5,352,401 A | * | 10/1994 | Dalgewicz et al. | 264/299 |
| 5,368,811 A | | 11/1994 | Taniguchi et al. | |
| 5,403,454 A | | 4/1995 | Taniguchi et al. | |
| 5,932,685 A | * | 8/1999 | Mori et al. | 428/347 |
| 6,329,055 B1 | * | 12/2001 | Higashiura et al. | 174/110 A |

* cited by examiner

Primary Examiner—Rena Dye
(74) Attorney, Agent, or Firm—Shanks & Herbert

(57) ABSTRACT

The present invention provides a polyester heat-shrinkable tube for coating electrolytic condenser molded from a resin composition comprising a) 80 to 99 wt % of a copolymerized polyester resin with an intrinsic viscosity of 0.65 to 1.0 dl/g, which comprises 1 to 15 mol % of polyethylene naphthalate and 85 to 90 mol % of polyethylene terephthalate, and b) 1 to 20 wt % of polybutylene terephthalate resin. The polyester heat-shrinkable tube of the present invention has superior heat resistance, strength and coating-adhesion property, so that no cracks may occur in dry-heat treatment after the coating and contraction step, and also that the tube can be tightly adhered to the condenser.

5 Claims, No Drawings

POLYESTER HEAT-SHRINKABLE TUBE FOR COATING AN ELECTROLYTE CONDENSER

This application claims priority to Republic of Korean Patent Application 2000-2686 filed Jan. 20, 2000.

1. Field of the Invention

This invention relates to a polyester heat-shrinkable tube for coating an electrolytic condenser.

2. Description of the Related Art

In prior art, polyvinyl chloride (PVC) heat-shrinkable tube has been used in coating an electrolytic condenser for the purpose of the protection and insulation of the condenser. In the above coating process, an electrolytic condenser is coated with polyvinyl chloride heat-shrinkable tube, and then subjected to heat contraction at 230 to 250° C. for 2 to 3 seconds, washed with water at 70 to 80° C. and dry heat treated at 160° C. for about 3 minutes together with dry and heat-resistance test. For the test of the coating layer, pinhole and falling tests have been performed.

However, since the prior polyvinyl chloride heat-shrinkable tube used in coating the electrolytic condenser has a weak heat resistance and strength, serious cracks may occur in the dry heat treatment after the pinhole test. Furthermore, the tube is not completely adhered to the condenser, causing a quality deterioration of the product. Therefore, there has been a strong desire for the development of a heat-shrinkable tube with better heat-resistance, strength, and coating-adhesion property. Furthermore, it has become known that polyvinyl chloride resin cannot be recycled and rather produces dioxin in incineration, causing an environmental pollution to a great extent. In the year of 2000, the use of polyvinyl chloride resin will be strictly prohibited in Europe and Japan.

SUMMARY OF THE INVENTION

The object of the present invention is to provide a polyester heat-shrinkable tube for coating an electrolytic condenser, which has superior heat resistance, strength and coating-adhesion property, so that no cracks may occur in dry-heat treatment after the coating and contraction step, and also that the tube can be tightly adhered to the condenser.

DETAILED DESCRIPTION OF THE INVENTION

The polyester heat-shrinkable tube for coating an electrolytic condenser according to the present invention is molded from a resin composition comprising (a) 80 to 99 wt % of a copolymerized polyester resin having an intrinsic viscosity of 0.65 to 1.0 dl/g, which comprises 1 to 15 mol % of polyethylene naphthalate and 85 to 99 mol % of polyethylene terephthalate, and (b) 1 to 20 wt % of polybutylene terephthalate resin.

As for the above copolymerized polyester resin comprising 1 to 15 mol % of polyethylene naphthalate and 85 to 99 mol % of polyethylene terephthalate, a polyethylene terephthalate copolymer copolymerized with a certain amount of dimethyl ester of naphthalene dicarboxylic acid, or a mixture of copolymerized polyester and polyethylene terephthalate may be used.

The amount of polyethylene naphthalate in the copolymerized polyester resin is preferably in the range of 1 to 15 mol %, so that the copolymerized polyester resin so formed may have a crystallinity enough for easier tube molding. If the amount of polyethylene naphthalate is less than 1 mol %, tube-molding process cannot be properly performed, and in case of exceeding 15 mol %, the crystallization process of the polyester heat-shrinkable tube becomes so slow as to cause a reduction of the heat resistance.

The copolymerized polyester resin used in the present invention can be easily prepared based on a conventional method for manufacturing polyethylene terephthalate. More specifically, when preparing a polyester resin by reacting terephthalic acid or its ester-forming derivative with ethylene glycol or its ester-forming derivative, the copolymerized polyester resin of the present invention can be obtained by substituting 1 to 15 mol % of the acid component with naphthalene carboxylic acid or its ester-forming derivative.

It is preferred that the intrinsic viscosity of the copolymerized polyester resin is in the range of 0.65 to 1.0 dl/g. If the intrinsic viscosity is less than 0.65 dl/g, the resin does not have any favorable mechanical properties but in case of exceeding 1.0 dl/g, a film with thickness of less than 150 μm cannot be made.

The polybutylene terephthalate resin used in the present invention serves to control the crystallization rate of the total resin composition, thereby contributing much to an easy processing. Further, when the tube thus prepared is coated on the condenser, and then subjected to dry heat treatment at 170° C. for 3 minutes, there can be no space between the tube and the condenser. It is preferred that the amount of polybutylene terephthalate resin is in the range of 1 to 20 wt % of the total composition. If the amount of polybutylene terephthalate is less than 1 wt %, the crystallization process rate remains unchanged, but in case of exceeding 20 wt %, the tube molding process cannot be properly performed due to the increase of the crystallization rate.

The polybutylene terephthalate resin in the present invention may be obtained from a melt mixture of 70 to 90 wt % of polybutylene terephthalate and 0.1 to 30 wt % of pigment.

To control the crystallization rate, 0.01 to 1.0 wt % of metal salt of Benzoic acid or stearic acid may be added to the above composition. The addition of the above metal salt may adjust the crystallization rate to the size of condenser to be coated, thus enhancing its heat resistance.

Further, in order to enhance the flexibility and adhesion property of the heat-shrinkable tube, 1 to 5 wt % of polyester elastomer may be added to the composition.

If desired, it is possible to add stabilizer, pigment, dye, clay, lubricant and flame retardant in preparing the heat-shrinkable tube.

The polyester heat-shrinkable tube for coating an electrolytic condenser according to the present invention can be prepared by molding method such as tube or inflation method in such a manner that the copolymer composition is melted and extruded to form a tube-shaped body, followed by a biaxial drawing.

For example, the polyester heat-shrinkable tube of the present invention can be prepared in the following manner: the copolymer composition is extruded from a cyclic dye of extruder to form an undrawn tube-shaped body. The tube-shaped body so obtained is rapidly cooled in a cool bath and heated at a temperature higher than the second transition point temperature of the copolymer or copolymer mixture, and lower than a fluidized point. Then, the tube-shaped body is subjected to expansion by the addition of a compressed gas such as air or nitrogen gas, and then subjected to drawing in a transversal direction (TD) and a machine direction (MD) of the tube-shaped body using a differential speed roll. This biaxial drawing process may be continuously performed after the Extrusion molding of the tube-shaped body or after winding to a roll in an undrawn state.

As the appropriate thickness of the heat-shrinkable tube after the biaxial drawing is in the range of 50 to 100 μm, the undrawn tube-shaped body may be prepared considering this.

After the biaxial drawing, it is preferred that the boiling water contraction percentage of a heat-shrinkable tube is in the range of 40 to 60% in a TD and 5 to 15% in a MD. It is also preferred that the drawing ratio is in the range of 1.7 to 2.5 times in a TD and 1 to 1.5 times in a MD.

As mentioned above, when the polyester heat-shrinkable tube according to the present invention is coated and contracted on a condenser (the uneven structure with 24 mm in length and 12.5 mm outer diameter and has a curved surface at 2.5 mm from the bottom and the most deep site has a 11 mm in diameter, which is located at 4 mm from the bottom) with 13.3 mm in inner diameter and 75 μm in thickness, followed by a drying heat treatment (170° C. for 3 minutes), it is completely adhered to the condenser without producing any actual space between the tube and the condenser.

The polyester heat-shrinkable tube of the present invention, when measured by a differential scanning calorimeter (DSC), has a maximum recrystallization temperature of 110 to 140° C. and exothermic recrystallization energy of 8 to 25.5 Joule/g.

According to the present invention, a boiling water contraction percentage is adopted as the contraction percentage of the polyester heat-shrinkable tube and the measurement was made after the tub e was impregnated in boiling water of 980° C. for 30 seconds.

Hereinafter, the present invention is described in more detail based on the following preferable Examples and Comparative examples, but is not limited to the following Examples.

EXAMPLE 1

95.4 wt % of polyethylene terephthalate copolymer (intrinsic viscosity: 0.84), which is prepared by the copolymerization with 5 mol % of dimethyl ester of naphthalene dicarboxylic acid dried at 150° C. for 6 hours using a heat-wave recycling dry heater, were mixed with 2.5 wt % of polybutylene terephthalate resin containing 30 wt % of pigment, 0.1 wt % of sodium salt of stearic acid, and 2 wt % of polyester elastomer. Then, the mixture was put in an extruder equipped with a circular die, and a tube-shaped body (outer diameter: 7 mm, thickness: 150 μm) was extruded from the extruder at a cylinder temperature of 220 to 280° C. and die temperature of 260° C. Then the resultant product was cooled in a water bath and then wound on a roll.

To the end of the obtained tube-shaped body, a compressed air of 0.7 kg/cm$^2$ was injected and heated in a hot water of 90° C. for expansion. At the same time, a tension was provided in a MD by a differential speed roll to perform a simultaneous biaxial drawing under the following conditions: in an axial drawing ratio of 1.05, a transversal drawing ratio of 2.0, and a drawing rate of 10 m/min.

Thus prepared heat-shrinkable tube had an inner diameter of 3.3 mm, a thickness of 75 μm, a contraction percentage in a transversal direction of 48%, and a contraction percentage in a MD of 8%.

EXAMPLES 2 to 5

The process was performed in the same manner as Example 1 except for the composition (see Table 1).

Comparative Examples 1 to 4

The process was performed in the same manner as Example 1 except for the composition (see Table 1).

Thus obtained heat-shrinkable tubes were evaluated in the following manner.

Measurement of the Exothermic Energy in Recrystallization

Each 5 to 10 mg of the above heat-shrinkable tubes was collected to determine its exothermic energy in recrystallization at 20° C./min in the range of 20 to 270° C., using a differential scanning calorimeter (Perkin-Elmer Co., DSC7). The results were shown in the following Table 1.

Coating Adhesion Property

Each of the thus prepared heat-shrinkable tube was coated on a condenser with 12.5 mm in diameter, and heat-contracted at the temperature of 260 to 280° C. for 8 seconds, and the coating adhesion property was determined. The results are shown in the following Table 2.

Dry Heat Resistance

Each of the heat-shrinkable tube thus prepared was coated on a condenser with 12.5 mm in diameter, contracted by heat at 260 to 280° C. for 8 seconds and subjected to dry heat treatment at 170±5° C. for 3 minutes. Dry heat resistance was determined and its results are shown in the Following Table 2.

Hot Water Resistance

Each of the heat-shrinkable tube thus prepared was coated on a condenser with 12.5 mm in diameter, contracted by heat at 260 to 280° C. for 8 seconds and treated by hot water at 100±2° C. for 10 minutes to measure the hot water resistance. The results were shown in the following Table 2.

TABLE 1

| | Composition | | | | | | Property Recrystal | | |
|---|---|---|---|---|---|---|---|---|---|
| | A | B | C | D | E | F | G | H | I |
| Ex. 1 | 95.4 | 5 | 2.5 | 30 | 0.1 | 2 | 20.84 | 135.5 | 0.84 |
| Ex. 2 | 95.4 | 8 | 2.5 | 30 | 0.1 | 2 | 24.52 | 139.6 | 0.82 |
| Ex. 3 | 82.7 | 13 | 15 | 30 | 0.3 | 2 | 12.23 | 138.7 | 0.74 |
| Ex. 4 | 91.95 | 5 | 5 | 20 | 0.05 | 3 | 22.66 | 135.1 | 0.84 |
| Ex. 5 | 92.9 | 5 | 3 | 0 | 0 | 0 | 17.95 | 131.5 | 0.71 |
| Com. Ex. 1 | 95.4 | 0 | 2.5 | 30 | 0.1 | 2 | 7.53 | 115.2 | 0.82 |
| Com. Ex. 2 | 95.4 | 17 | 2.5 | 30 | 0.1 | 2 | 3.52 | 152.3 | 0.82 |
| Com. Ex. 3 | 97.9 | 5 | 0 | — | 0.1 | 2 | 26.21 | 138.1 | 0.69 |
| Com. Ex. 4 | 67.9 | 5 | 30 | 30 | 0.1 | 2 | 6.25 | 105.2 | 0.84 |

Note:
A: content of copolymerized polyester resin (wt %),
B: content of ethylene naphthalene in copolymerized polyester resin (mol %),
C: content of polybutylene terephthalate (wt %),
D: content of pigment in polybutylene terephthalate (wt %),
E: content of sodium stearate (wt %),
F: content of polyester elastomer (wt %),
G: exothermic amount (Joule/g),
H: peak temperature (° C.), and
I: intrinsic viscosity of copolymerized polyester resin (dl/g).

TABLE 2

| | Coating adhesion | Heat resistance | Hot water Resistance |
|---|---|---|---|
| Ex. 1 | O | O | O |
| Ex. 2 | O | O | O |
| Ex. 3 | O | O | O |
| Ex. 4 | O | O | O |
| Ex. 5 | O | O | O |
| Com. Ex. 1 | O[1] | X[2] | X |
| Com. Ex. 2 | O | X | X |

TABLE 2-continued

|  | Coating adhesion | Heat resistance | Hot water Resistance |
|---|---|---|---|
| Com. Ex. 3 | O | X | X |
| Com. Ex. 4 | X | X | X |

[1]O:Completely adhered to the outer wall of the condenser.
[2]X:Occurrence of uneven sites without complete adhesion to the outer wall of condenser.

What is claimed is:

1. A polyester heat-shrinkable tube for coating an electrolytic condenser, molded from a resin composition comprising:
   a) from 80 to 99 wt % of copolymerized polyester resin with an intrinsic viscosity of from 0.65 to 1.0 dl/g comprising from 1 to 15 mol % of polyethylene naphthalate and from 85 to 90 mol % of polyethylene terephthalate; and
   b) from 1 to 20 wt % of polybutylene terephthalate resin.

2. The polyester heat-shrinkable tube for coating electrolytic condenser according to claim 1, wherein said polybutylene terephthalate resin is a melt mixture of from 70 to 90 wt % of polybutylene terephthalate and from 0.1 to 30 wt % of pigment.

3. The polyester heat-shrinkable tube for coating electrolytic condenser according to claim 1 or 2, wherein said resin composition further comprises from 0.01 to 1.0 wt % of a metal salt of benzoic acid or stearic acid.

4. The polyester heat-shrinkable tube for coating electrolytic condenser according to claim 1 or 2, wherein said resin composition further comprises from 1 to 5 wt % of polyester elastomer.

5. The polyester heat-shrinkable tube for coating electrolytic condenser according to claim 1 or 2, wherein the maximum temperature for recrystallization is in the range of from 110 to 140° C. and the exothermic energy for recrystallization is in the range of from 8 to 25.5 Joule/g.

* * * * *